(12) United States Patent
Davis et al.

(10) Patent No.: US 7,413,828 B2
(45) Date of Patent: Aug. 19, 2008

(54) WAFER ALKALINE CELL

(75) Inventors: Stuart M. Davis, Norfolk, MA (US); Jonathan M. Boulton, North Attleboro, MA (US); George Cintra, Holliston, MA (US); Leslie Pinnell, Framingham, MA (US); Charles E. O'Brien, Revere, MA (US)

(73) Assignee: The Gillette Company, Boston, MA (US)

( * ) Notice: Subject to any disclaimer, the term of this patent is extended or adjusted under 35 U.S.C. 154(b) by 772 days.

(21) Appl. No.: 10/803,438

(22) Filed: Mar. 18, 2004

(65) Prior Publication Data

US 2005/0208373 A1 Sep. 22, 2005

(51) Int. Cl.
*H01M 6/04* (2006.01)
*H01M 6/12* (2006.01)

(52) U.S. Cl. .................. 429/162; 429/178; 429/206; 429/245

(58) Field of Classification Search .............. None
See application file for complete search history.

(56) References Cited

U.S. PATENT DOCUMENTS

| | | | |
|---|---|---|---|
| 2,966,538 A | 12/1960 | Bernot | |
| 3,525,647 A | 8/1970 | Strauss | |
| 3,563,805 A | 2/1971 | Deierhol | |
| 3,871,921 A | 3/1975 | Beatty | |
| 3,997,365 A | 12/1976 | Feldhake | |
| 4,098,965 A | 7/1978 | Kinsman | |
| 4,105,815 A | 8/1978 | Buckler | |
| 4,119,770 A | 10/1978 | Land | |
| 4,137,627 A | 2/1979 | Kinsman | |
| 4,145,485 A | 3/1979 | Kinsman | |
| 4,177,330 A | 12/1979 | Gordon | |
| 6,103,417 A * | 8/2000 | Rapeli | 429/145 |
| 6,106,973 A | 8/2000 | Sonozaki | |
| 6,576,365 B1 | 6/2003 | Meitav | |
| 2003/0059673 A1 | 3/2003 | Langan | |

(Continued)

FOREIGN PATENT DOCUMENTS

EP   1 154 507 A2   11/2001

(Continued)

OTHER PUBLICATIONS

Davis, S. M., and Hull, M.N., "Aspects of Alkaline Cell Leakage", Journal of the Electrochemical Society, vol. 125, No. 12, (Dec. 1978), p. 1918-1923.

(Continued)

*Primary Examiner*—John S Maples
(74) *Attorney, Agent, or Firm*—Barry D. Josephs

(57) ABSTRACT

A wafer alkaline cell of a laminar structure is disclosed. The cell has a pair of opposing sides comprising at least the majority of the boundary surface of said cell. The opposing sides define a short cell dimension therebetween. The cell comprises an anode assembly and a cathode assembly bonded together to form a laminate structure. The cell comprises a single frame or two separate frames housing the anode and cathode material. The anode assembly has an anode material therein typically comprising zinc and the cathode assembly has a cathode material therein typically comprising manganese dioxide. The cell is durable and preferably rigid, has elongated leak block paths, and resists electrolyte leakage.

30 Claims, 11 Drawing Sheets

U.S. PATENT DOCUMENTS

2003/0165744 A1    9/2003    Schubert
2003/0180612 A1*  9/2003    Kilby et al. ................ 429/224
2003/0228517 A1   12/2003   Holl

FOREIGN PATENT DOCUMENTS

WO    WO 97/03133    1/1997

OTHER PUBLICATIONS

Hull, M.N. and James H.I., "Why Alkaline Cells Leak", Journal of the Electrochemical Society, vol. 124, No. 3, (Mar. 1978), p. 332-339.

Watanabe, J., et. al., Ultra-Thiin Sheet Dry Battery "Paper Battery", Progress in Batteries & Solar Cells, Vil. 3 (1980), p. 118-124, no month.

* cited by examiner

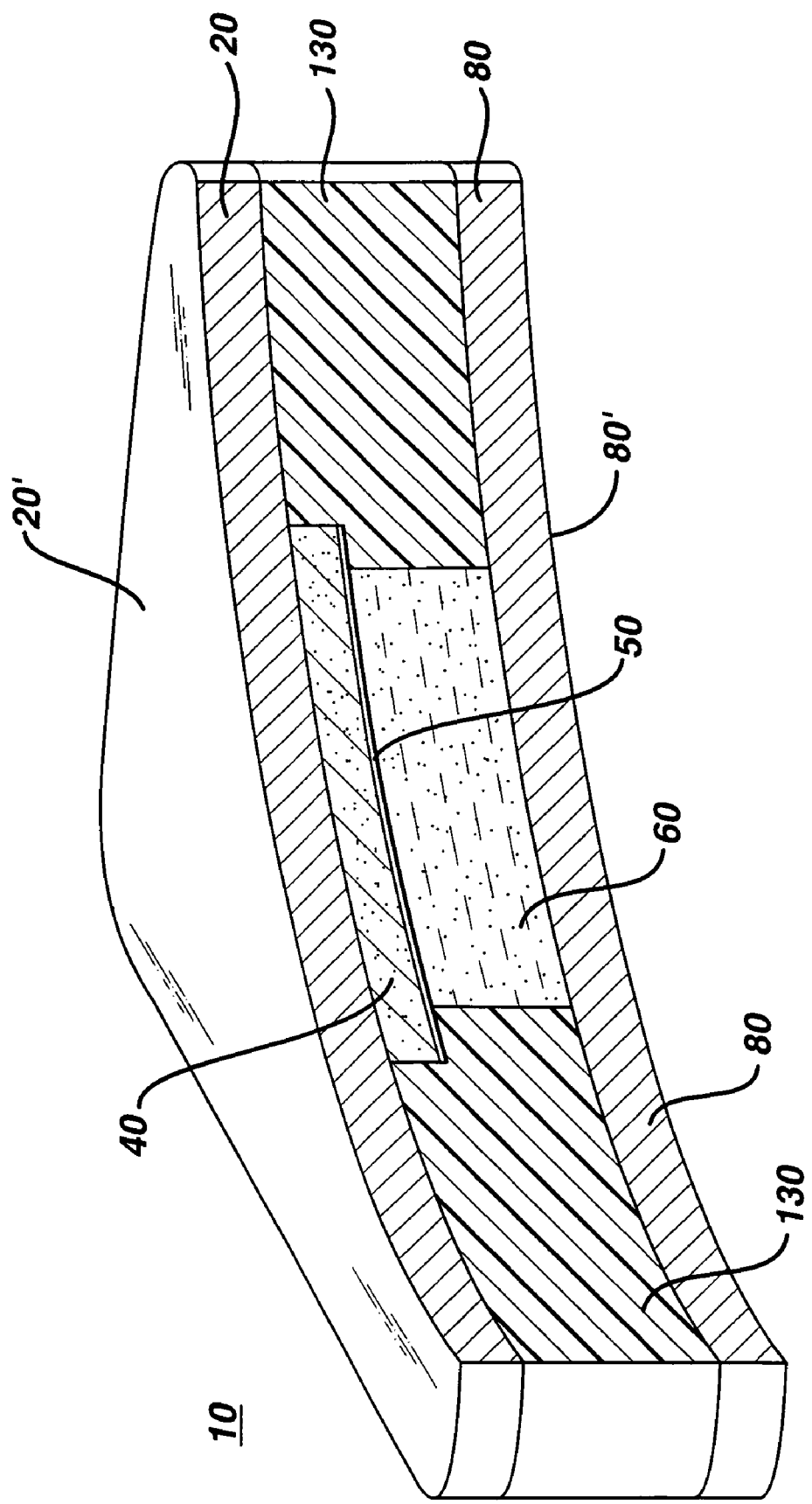

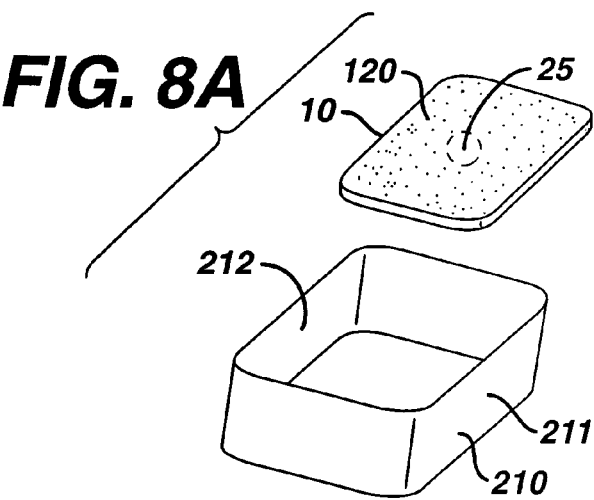 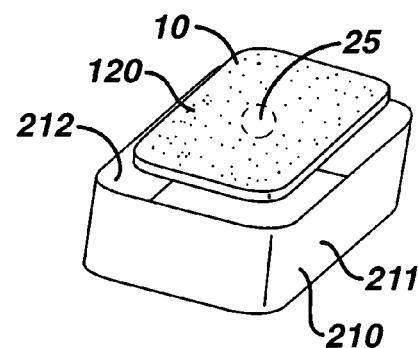 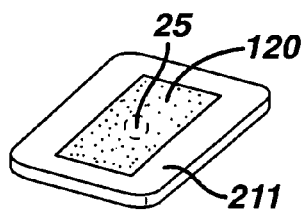 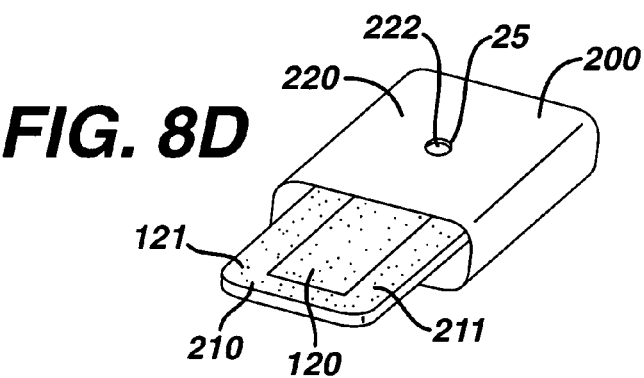 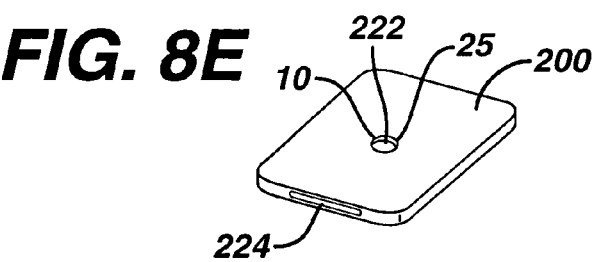

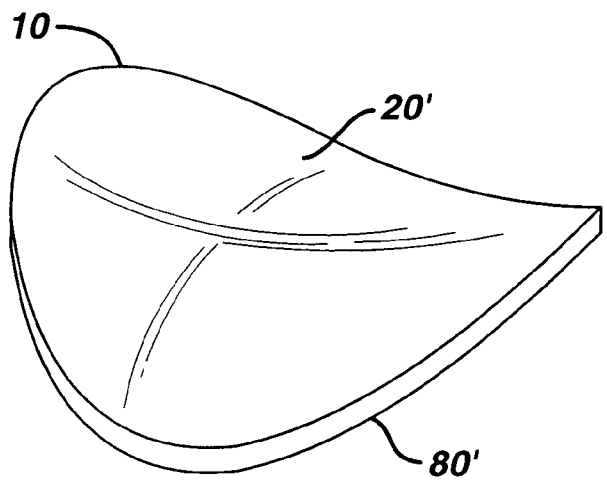
FIG. 9A
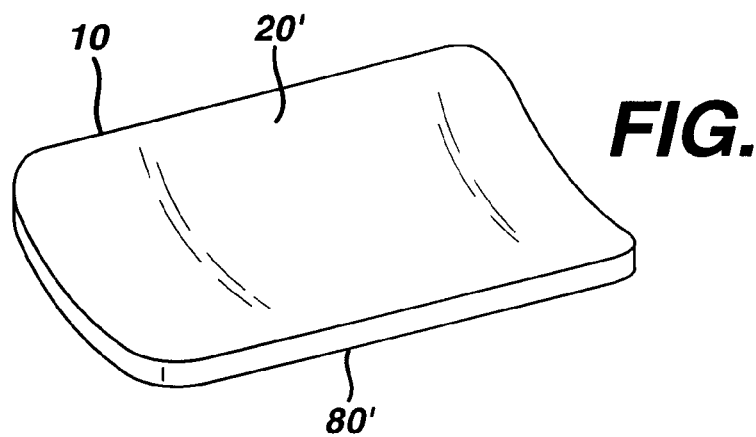
FIG. 9B
FIG. 9C
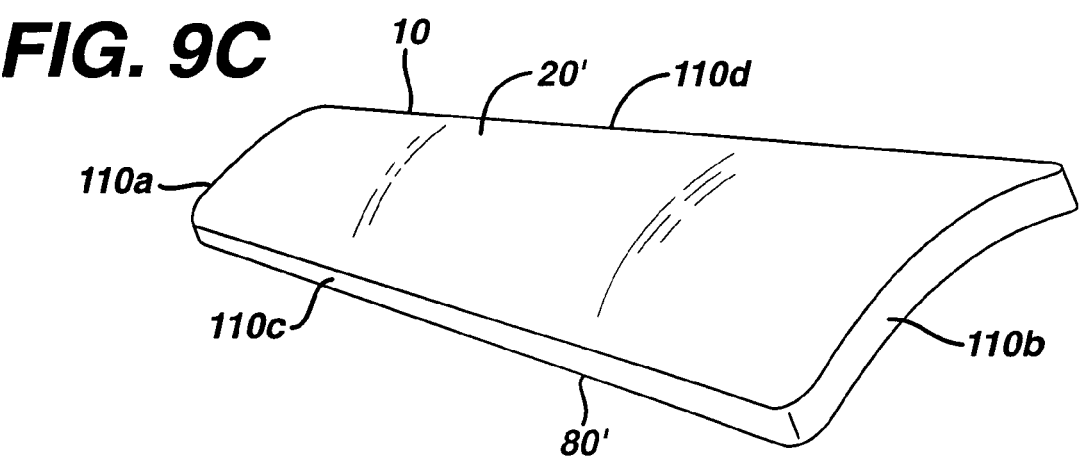

WAFER ALKALINE CELL

FIELD OF THE INVENTION

The invention relates to a wafer alkaline battery having a substantially laminar construction and a high aspect ratio of area to thickness. The invention in a principal aspect relates to a wafer alkaline battery wherein the anode comprises zinc and the cathode comprises manganese dioxide.

BACKGROUND

Conventional alkaline electrochemical cells have an anode comprising zinc and a cathode comprising manganese dioxide. The cell is typically formed of a cylindrical outer housing. The fresh cell has an open circuit voltage (EMF) of about 1.6 volt and typical average running voltage of between about 1.0 to 1.2 Volts in medium drain service (100 to 300 milliamp). The cylindrical housing is initially formed with an enlarged open end and opposing closed end. After the cell contents are supplied, an end cap assembly with insulating grommet and negative terminal end cap is inserted into the housing open end. The open end is closed by crimping the housing edge over an edge of the insulating grommet and radially compressing the housing around the insulating grommet to provide a tight seal. The insulating grommet electrically insulates the negative end cap from the cell housing. A portion of the cell housing at the opposing closed end forms the positive terminal.

Conventional alkaline cells of cylindrical shape are available in a variety of commonly recognizable sizes, namely, AAAA, AAA, AA, C and D size cells. In commonly assigned U.S. patent application Ser. No. 10/722,879 filed Nov. 26, 2003 a laminar cell is described wherein the cell contents are encased in a solid metal casing. The metal casing has an integral body surface having a closed end and opposing open end. The cell contents are inserted into the open end, which is then sealed with an end cap. The end cap is designed with a metal skirt, a plastic insulating grommet, and a metal post or rivet, disposed within the grommet. The metal skirt is compressed around the insulating grommet and the grommet is compressed around the metal post to form an alkali resistant seal at both interfaces. The metal skirt of the end cap assembly is then joined to the metal casing by welding.

It becomes increasingly more difficult to fill such cells with anode and cathode material as the desired cell thickness becomes smaller, for example, much under about 6 mm. Thus, there is a need for a flat or laminar alkaline cell, which may be readily fabricated and filled with cell contents even at cell thickness less than about 6 mm, for example, between about 0.5 mm and 6 mm, desirably between about 1.5 and 4 mm. This will make the thin, prismatic alkaline cell available for use as a primary (nonrechargeable) power source or as a back up power source for small electronic devices which may normally be powered by a thin, rechargeable cell, such as a thin lithium-ion cell. By suitable adjustment of the cell chemistry and internal components, a thin alkaline rechargeable cell could also be constructed. Many electronic devices, such as portable radios, audio players, and communication devices have become smaller and thinner in recent years. Thus, there is a need for thin, laminar, wafer cells of small overall thickness for use in such small electronic devices.

Primary alkaline electrochemical cells typically include a zinc anode active material, an alkaline electrolyte, a manganese dioxide cathode active material, and an electrolyte permeable separator film, typically of cellulose or cellulosic and polyvinyl alcohol fibers. The anode active material can include for example, zinc particles admixed with conventional gelling agents, such as sodium carboxymethyl cellulose or the sodium salt of an acrylic acid copolymer, and an electrolyte. The gelling agent serves to suspend the zinc particles and to maintain them in contact with one another. Typically, a conductive metal nail inserted into the anode active material serves as the anode current collector, which is electrically connected to the negative terminal end cap. The electrolyte can be an aqueous solution of an alkali metal hydroxide for example, potassium hydroxide, sodium hydroxide or lithium hydroxide. The cathode typically includes particulate manganese dioxide as the electrochemically active material admixed with an electrically conductive additive, typically graphite material, to enhance electrical conductivity. Optionally, small amount of polymeric binders, for example polyethylene binder and other additives, such as titanium-containing compounds can be added to the cathode.

The manganese dioxide used in the cathode is preferably electrolytic manganese dioxide (EMD) which is made by direct electrolysis of a bath of manganese sulfate and sulfuric acid. The EMD is desirable, since it has a high density and high purity. The electrical conductivity (1/resistivity) of EMD is fairly low. An electrically conductive material is added to the cathode mixture to improve the electric conductivity between individual manganese dioxide particles. Such electrically conductive additive also improves electric conductivity between the manganese dioxide particles and the cell housing, which also serves as cathode current collector in conventional cylindrical alkaline cells. Suitable electrically conductive additives can include, for example, graphite, graphitic material, conductive carbon powders, such as carbon blacks, including acetylene blacks. Preferably the conductive material comprises flaky crystalline natural graphite, or flaky crystalline synthetic graphite, or expanded or exfoliated graphite or graphitic carbon nanofibers and mixtures thereof.

There are small sized rectangular shaped rechargeable batteries now available, which are used to power small electronic devices such as MP3 audio players and mini disk (MD) players. These batteries are typically small and of rectangular shape (cuboid) somewhat the size of a pack of chewing gum. The term "cuboid" as used herein shall mean its normal geometrical definition, namely, a "rectangular parallelepiped". Such batteries, for example, can be in the form of rechargeable nickel metal hydride (NiMH) size F6 or 7/5F6 size cuboids in accordance with the standard size for such batteries as set forth by the International Electrotechnical Commission (IEC). The F6 size has a thickness of 6.0 mm, width of 17.0 mm and length of 35.7 mm (without label). There is a version of the F6 size wherein the length can be as great as about 48.0 mm. The 7/5-F6 size has thickness of 6.0 mm, width of 17.0 mm, and length of 67.3 mm. The average running voltage of the F6 or 7/5F6 NiMH rechargeable batteries when used to power miniature digital audio players such as an MP3 audio player or mini disk (MD) players is between about 1.0 and 1.2 volt typically about 1.12 volt.

When used to power the mini disk (MD) player the battery is drained at a rate of between about 200 and 250 milliAmp. When used to power a digital audio MP3 player the battery is drained typically at a rate of about 100 milliAmp.

It would be desirable to have a small flat alkaline battery of the same size and shape as small size cuboid shaped (rectangular parallelepiped) nickel metal hydride batteries, so that the small alkaline size battery can be used interchangeably with the nickel metal hydride battery to power small electronic devices such as mini disk or MP3 players.

As above mentioned it would also be desirable to have a wafer alkaline cell of overall thickness less than 6 mm, for example, between about 0.5 and 6 mm, preferably between about 1.5 and 4 mm.

It is desired that the wafer cell be designed to minimize or greatly reduce the chance of electrolyte leakage. In references M. Hull, H. James, "Why Alkaline Cells Leak" Journal of the Electrochemical Society, Vol. 124, No. 3, March 1977, pps. 332-329) and S. Davis, M. Hull, "Aspects of Alkaline Cell Leakage", Journal of the Electrochemical Society, Vol. 125, No. 12, December 1978) one aspect of alkaline cell leakage is explained in terms of the electrochemical reduction of atmospheric oxygen in the presence of adsorbed moisture, on the negative, exterior cell terminal to form $OH^-$ ions. These electrochemically generated $OH^-$ ions then attract hydrated positive ions such as $K(H_2O)_x^+$ or $Na(H_2O)_x^+$. The $K(H_2O)_x^+$ or $Na(H_2O)_x^+$ ions originate from the cell interior, migrating across the negative seal surface to the cell exterior, in order to maintain electrical neutrality in the adsorbed film of moisture. This tends to draw KOH or NaOH electrolyte from the cell interior to the terminal surface and thus in effect promotes migration or creepage of such electrolyte from the cell interior to the terminal surface.

It is also desired that such thin wafer cells should contain enough active material to serve as a long lived power source for a power consuming device. Thus, while thin, the wafer cells should also possess a projected area and a sufficiently large interior volume to contain enough active materials to deliver electrical energy at a substantial rate and for a substantial time.

In the discussion that follows, a wafer cell shall mean a thin, laminar unit cell. The cell may have one or more of its surfaces flat or curved or randomly distorted. The cell may have a uniform thickness or its thickness may vary from point to point. The cell may be symmetrical or unsymmetrical with regard to any point, axis or plane. The "footprint" of the cell is defined as the maximum, orthogonal projected area of the cell on any plane surface, when all possible orientations of the cell have been considered.

The edges of the cell are the outer surfaces, one or more of which will constitute the thickness dimension depending on cell shape. In the case of a cell with varying thickness, the thickness will have a maximum value at some given point. The face of the cell is the one outer surface which defines the footprint of the cell and which has a nominally perpendicular thickness axis. In the case where the cell is flat and of uniform thickness, the area of either face will equal that of the cell footprint. In the case where the cell is either curved, or of non-uniform thickness, or both, the area of either face may match, or exceed that of the cell footprint. In a similar manner, the edges of the cell need not be of uniform thickness.

It would be desirable that such wafer cell be readily manufactured to conform to various overall shapes and sizes, for example, wherein at least one of the sides is polygonal or alternatively circular, oval or at least partially curvilinear.

Thus, it would be desirable to have such wafer cell to be readily manufactured, to enable easy insertion of the cell contents even at such small cell thickness of less than 6 mm. The wafer cell must yet be sturdy and durable enough to withstand internal pressure from evolved gas, resist damage from mechanical abuse and handling and avoid any electrolyte leakage due to seal failure.

SUMMARY OF THE INVENTION

A principal aspect of the invention is directed to a primary or secondary wafer alkaline cell. The wafer cell is designed to function as a source of electrical energy, comprising a negative and a positive terminal, and a pair of opposing sides comprising at least the majority of the boundary surface of said cell. The opposing sides define at some point an average short cell dimension (the thickness) therebetween. The cell comprises an anode assembly and a cathode assembly bonded together to form a laminate structure.

In one aspect the cell can be of a substantially laminar construction which includes various seal interfaces between the conductive and non-conductive elements therein. A sealant is disposed within these interfaces which is resistant to alkaline electrolyte. The seal interfaces containing sealant are protected from peeling and shearing forces through mechanical design features or by the use of a structural adhesive. A novel cell design and over-wrap design is employed to assure that the potential leakage path from the cell interior to either of the two cell terminals is substantially longer than the battery thickness dimension.

In a principal aspect the wafer alkaline cell of the invention has an anode comprising zinc, a cathode comprising manganese dioxide and an alkaline electrolyte, preferably aqueous potassium hydroxide. However, the wafer alkaline cell may have anode and cathode of other active materials and other alkaline electrolytes are possible. For example, the anode may comprise zinc, cadmium or metal hydride alloy and the cathode may comprise manganese dioxide, nickel oxyhydroxide, silver oxide ($Ag_2O$ or AgO alone or in admixture), copper oxide (CuO), silver copper oxide ($AgCuO_2$ or $Ag_2Cu_2O_3$ alone or in admixture with each other or in admixture with $MnO_2$). Each one of the above listed anode materials can be matched up with each one of the above listed cathode materials. The alkaline electrolyte may comprise sodium hydroxide or mixtures of sodium hydroxide and potassium hydroxide, which reduces the tendency of the electrolyte to migrate from the cell interior. The wafer cell may also be in the form of a rechargeable battery.

Included within the anode assembly or within the cathode assembly is a separator layer which may be an ion permeable film, membrane or non-woven fabric. Alternatively, the separator layer may be situated between the anode and cathode assemblies and in some embodiments may project into a portion of the seal area formed by the mating surfaces of the anode and cathode assemblies.

In a specific embodiment the cell is in the shape of a cuboid. The cell may have a shallow thickness, for example between about 0.5 to 6 mm, for example, between about 1.5 and 6 mm, typically between about 1.5 to 4 mm.

In a principal aspect of the invention the anode assembly comprises a housing for said anode, and the cathode assembly comprises a housing for said cathode. A separator layer may be disposed within the anode or cathode assembly so as to face the opposite assembly or the separator may be disposed in between these two assemblies. The anode and cathode assemblies are preferably adhesively bonded together with the separator situated in between the anode and cathode active materials to form a durable, and preferably rigid, compact, laminate structure.

In an aspect of the invention the anode housing, forming a part of the anode assembly, comprises an anode frame, preferably of durable plastic, having an inner peripheral edge defining the boundary of an anode cavity. The frame has a front side and opposing back side along said peripheral edge. An anode current collector sheet is bonded to the back side of the frame so that it faces an outer surface boundary of the cell. The anode material is inserted into said anode cavity so that it is in contact with said anode current collector sheet. The current collector sheet is electrically conductive, preferably a metal, preferably of copper, brass, bronze, tin or zinc, or of copper or brass plated with zinc, tin, silver, indium or bismuth or combinations of these metals.

The cathode housing, which forms part of the cathode assembly, comprises a cathode frame, preferably of durable plastic, having an inner peripheral edge defining the boundary of a cathode cavity. The frame has a front side and opposing back side along said peripheral edge. A cathode current collector sheet is bonded to the back side of the frame so that it faces an outer surface boundary of the cell. Cathode material is inserted into the cathode cavity so that it is in contact with said cathode current collector sheet. The cathode current collector sheet is preferably of nickel, nickel plated steel or a carbon coated metal sheet, preferably a carbon coated or carbonized nickel sheet. Alternatively, the cathode current collector sheet may be of cold rolled steel, which is plated or clad with nickel. The nickel may be overlayed with carbon, or a layer of cobalt and then a layer of carbon over the cobalt. In another embodiment, the cathode current collector may be overlayed with carbon and then coated with a carbon containing paint.

In another aspect a single frame may be used instead of separate anode and cathode frames. In such embodiment the single frame construction, preferably of plastic, has the advantage that the anode material and cathode can be packed into opposite sides of the single frame avoiding the need to bond individual frames together.

An advantage of the laminate wafer cell structure of the invention is that a cell of essentially any footprint size ranging from very small, e.g 1 cm$^2$ to very large, e.g. 600 cm$^2$, but yet of small overall thickness, e.g. between about 1.5 and 6 mm, typically between about 1.5 and 4 mm, may be readily fabricated. The cell thickness could even be lower, for example, to as low as about 0.5 mm. Thus the cell can be easily fitted into cavities of electronic devices having small overall thickness. Another advantage of the laminate cell structure is that it may be made to essentially any desired overall shape, for example, polygonal, oval, circular, curvilinear, or partially polygonal and partially curvilinear. The laminate cell of the invention is durable and tightly bonded so that it may be exposed to hot and cold climates and atmospheres of high and low humidity and still resist electrolyte leakage.

In the wafer cell of the invention the chance of electrolyte leakage is reduced by three methods:

1) By creating a very tightly bonded and essentially electrolyte impermeable seal between the cell interior and the anode and cathode current collector sheets.

2) By creating a very long, tortuous path (leakage blocking path) which electrolyte from within the cell would have to take in order to escape from the cell. The total leakage blocking path consists of the sum of the frame width plus the distance from the outer edge of the frame to the exposed cell terminal.

3) By decreasing the surface area of the exposed exterior negative contact to a minimum, thereby decreasing the overall rate of OH$^-$ generation on the exterior negative contact surface.

With respect to electrolyte leak reduction method 1, a tightly bonded, electrolyte impermeable seal is accomplished in the wafer cell of the invention preferably by employing a staged adhesive seal between the edge of the frame and the edge of each of the anode and cathode current collector sheets. The staged seal comprises at least two coatings of different adhesives in a juxtaposed (side by side) arrangement along the edges of the plastic frame in order to bond the current collector sheets to their respective frame. The outer adhesive coating is preferably a structural type adhesive such as an epoxy. Such adhesive imparts structural strength to the laminar cell construction. The inner coating is preferably a adhesive-sealant which may, for example, may be a polyamide or functionalized polyethylene, or asphalt solution. Such sealant coating improves overall bonding but its principal function is to seal out electrolyte. Alternatively, rivets can be employed in addition to or in place of the structural adhesive and the sealant coating can be applied to the portion of the frame between the rivets.

With respect to electrolyte leak reduction method 2, this involves providing an increased length or relatively long blockage path to reduce the chance of electrolyte leaking from the cell interior to the external environment. In this respect it has been determined desirable to set the length of any potential leakage path, measured from the edge of either active electrode to its corresponding terminal contact on the exterior of the battery, to be substantially greater than the overall cell thickness. In a preferred embodiment herein, the ratio of potential leakage path (leakage block path) to battery thickness is greater than 1.5 and more preferably is greater than 2.

This is achieved by two different means, which may be employed separately or in a cooperative fashion.

In the first means, the width of the plastic frame provides a first leakage block path A. The width of the plastic frame (leakage block path A) is measured from the frame's inner peripheral edge (in contact with battery active material and electrolyte) to its outer peripheral edge, and should be set to approximately as long or longer than the thickness dimension of the cell. Thus, for a 3 mm (1/8") thick cell, the width (A) of the frame is desirably approximately 3 mm (1/8") or greater. While it would be desirable to increase the frame width (leakage block path A) to a maximum in order to deter leakage, it will be appreciated that this will come at the expense of the internal volume available for active material within the cell. Thus, for a given cell footprint (cell side parallel or substantially parallel to the face of the anode or cathode frame), there is an upper limit to the width of the frame that will allow a reasonable amount of active material to be packed into the cell.

In the second means, the exterior surfaces of the cell are desirably covered with a plastic film, adhered to the exterior surfaces of the cell by a sealant, including all of the exposed edges of the plastic frames and also most of the surface of the two conductive endplates (current collector sheets), excluding only a small terminal contact area on each endplate, located at a distance from the outer peripheral edge of the frame. In a preferred embodiment, the exposed contact, e.g. the negative contact, is located on a conductive endplate at the greatest possible distance from all of the outer edges of the frame. Thus, there is defined a distance B from the outer peripheral edge of the anode frame to the exposed negative contact which is at least as long as the cell thickness. The distance B, defines the length of a second electrolyte leak block path (block path B). The distance B is traversed by a film wrap, preferably comprising first and second overlayed shrink film wrap bands, preferably having sealant therebetween and between the first wrap and the cell surface. The sealant between the first film band and the cell and sealant between the two film bands helps to achieve superior electrolyte blocking properties preventing or greatly retarding the chance of electrolyte leakage along path B. The first plastic shrink wrap is preferably a film band of plastic tubing (peripheral band) applied around the periphery (edges) of the cell. The central axis of the unshrunk band is oriented parallel to the thickness direction. After shrinking, this band covers and adheres to most of the sealant bearing exterior surfaces, including all of the edges and a substantial fraction of the conductive endplates. The cell terminal contact areas are excluded (these remain bare). Thus the potential leakage path is further extended from the outer peripheral edge of the frames towards the vicinity of the cell terminals.

A second plastic shrink wrap, preferably a film band of plastic tubing (lateral band), is applied to the cell, at right angles to the first band. The central axis of the unshrunk band is oriented perpendicular to the thickness dimension. The second shrink wrap (lateral band) is shrunk tight, covering the majority of the remaining exposed surface. The lateral band is furnished with small punched or cut holes which register with the sealant free contact areas on the outer metal endplates, thus exposing the cell terminals. The first and second shrink wrap bands (peripheral band and lateral band), together, cover the entire exterior surface of the cell, with the exception of the cell terminals.

To further enhance leakage resistance, prior to applying the 2nd lateral band, the exterior surfaces of the first shrink wrap band (peripheral band) may be coated with additional sealant, thus effecting a seal between the exterior of the first band (peripheral band) and the second band (lateral band). This assures that the only remaining exit points for any leaked electrolyte are the exposed cell contacts.

In the case where there are separate anode and cathode frames bonded together the first electrolyte leak block path (block path A) as referenced herein may be defined as having a length equal to the width of the anode frame peripheral edge, that is, the width of the frame edge that surrounds the hollow space within the frame. (However, it will be understood that by analogy the width of the cathode frame determines the first block path A on the cathode side of the cell.) In the case where there is a single common frame for housing both the anode and cathode material the first electrolyte leak block path (block path A) is defined as having a length equal to the edge width of this common frame. The second electrolyte leak block path (block path B) as above mentioned is measured as the distance from the outer peripheral edge boundary of the anode frame to the exposed negative contact on the cell surface. The total electrolyte leak block paths A+B is desirably at least between about 1.5 to 4 times the cell thickness and can be even greater for cells having very high footprint area.

With regard to leakage reduction method 3 this is achieved by minimizing the area of the exterior negative contact in proportion to the total area of the cell footprint. Thus, by covering as much of the exterior surface of the negative contact as possible, employing sealant and shrink plastic film, the ratio of exposed contact area to cell footprint area is minimized. Preferably this ratio is less than 5% (for a cell having 1 cm2 to 14.5 cm$^2$ footprint), more preferably less than 1% (for a cell having 14.5 cm$^2$ to 603 cm$^2$ footprint) and most preferably less than 0.1% (for a cell of 603 cm$^2$ or larger footprint).

The arrangement so described is applicable to wafer cells of the invention having various shapes such as square, rectangular, polygonal, circular or elliptical and surfaces which may be flat or curved.

The total leakage path consists of the sum of the frame width plus the distance from the outer edge of the frame to the cell terminal. In the preferred embodiment of the invention, the total leakage path is at least twice the thickness dimension of the cell. More preferably, the total leakage path is at least 3 times the thickness dimension of the cell and most preferably the total leakage path is at least 4 times the thickness dimension of the cell. By covering the cell exterior with sealant and shrink plastic film, the potential leakage path is further extended from the outer peripheral edge of the frames to the cell terminals. Utilizing the design principles herein disclosed, thin alkaline cells of very large area, e.g. 8.5 in×11 in or 93.5 in$^2$ (approx. 21.6 cm×27.9 cm or 603 cm$^2$) or larger may be constructed.

BRIEF DESCRIPTION OF THE DRAWINGS

FIG. 7A is a cut away cross sectional view of a second embodiment of the wafer cell of FIG. 1 having a single frame construction.

FIG. 8A is perspective view showing a shrinkable peripheral film band before it is inserted around the cell edge.

FIG. 8B is perspective view showing a shrinkable peripheral film band being inserted around the cell edge.

FIG. 8C is perspective view showing the cell with the peripheral film band shrunken around the cell edge.

FIG. 8D is perspective view showing a lateral shrinkable film band being inserted around the cell and over the peripheral film band.

FIG. 8E is perspective view showing the cell with the lateral film band shrunken around the cell.

FIG. 9A is a perspective view showing a wafer cell embodiment having a double curved surface.

FIG. 9B is a perspective view showing a wafer cell embodiment having a single curved surface.

FIG. 9C is a perspective view showing a wafer cell embodiment having a curved surface and nonuniform thickness.

DETAILED DESCRIPTON

Figure 1:
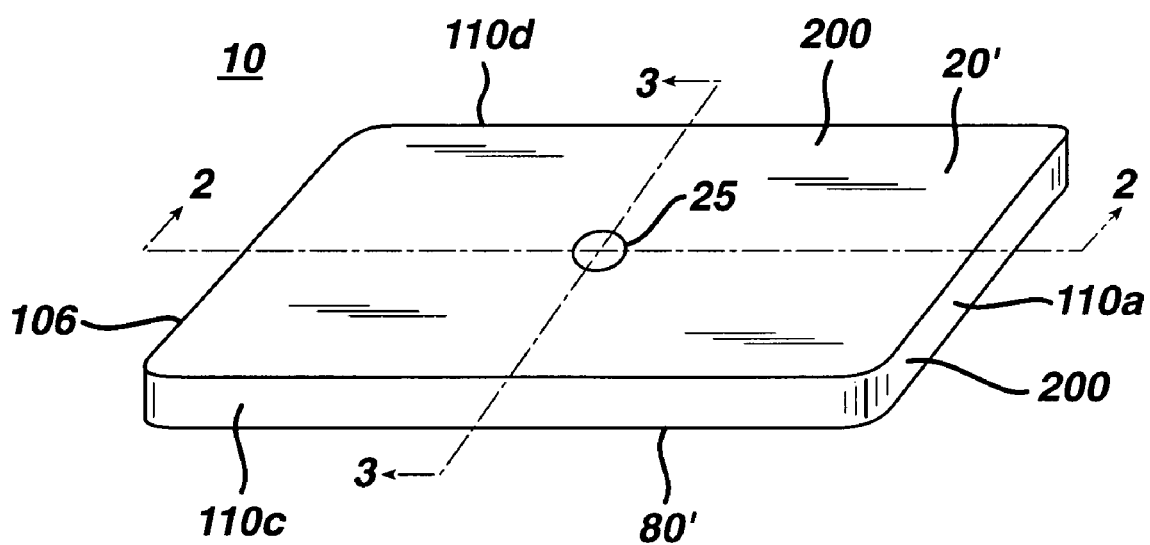
FIG. 1 is a perspective view of an embodiment of the wafer cell of the invention.

A representative wafer alkaline cell 10 of the invention is shown in FIG. 1. In the embodiment of FIG. 1 the cell has an overall rectangular shape with radiused corners. The cell 10 has two opposing rectangular laminar surfaces 20' and 80' forming the body of the cell and two pair of opposing rectangular end surfaces therebetween, one pair being end surfaces 110a, 110b, and the second pair being end surfaces 110c and 110d. Opposing laminar surfaces 20' and 80' are preferably parallel to each other. Opposing end surfaces 110a and 110b are preferably parallel to each other and opposing end surfaces 110c and 110d are preferably parallel to each other as shown in FIG. 1. Cell 10 is thus in the shape of a cuboid (rectangular parallelepiped) with radiused corners.

It will be appreciated that the opposing laminar surfaces 20' and 80' may be of other shapes for example, polygonal, and may also be circular, oval, or of curvilinear or partially curvilinear perimeter of varying surface area. Thus the invention is not intended to be limited to a rectangular cell. Opposing laminar surfaces 20' and 80' may be non-parallel. Thus the cell may have a variable thickness, if desired. Opposing laminar surfaces 20' and 80' may not be flat. Thus the cell can possess single or double curvature, with constant or variable thickness, if desired. A cell with a single curvature is shown, for example, in FIGS. 9B and 9C. In FIG. 9B the cell is curved inwardly (concave) when viewed down from top surface 20'. In FIG. 9C the cell is outwardly curved (convex) when viewed down from the top surface 20'. In FIG. 9C the cell is also thinner at one end 110a than at opposing end 110b. Similarly the width of the cell at end 110a may also be different than the width at opposing end 110b. In FIG. 9C the cell's width is smaller at end 110a than at opposing end 110b. The cell surface may also be of multiple curvature. In FIG. 9A a cell of a double (saddle) curvature is shown.

Figure 1A:
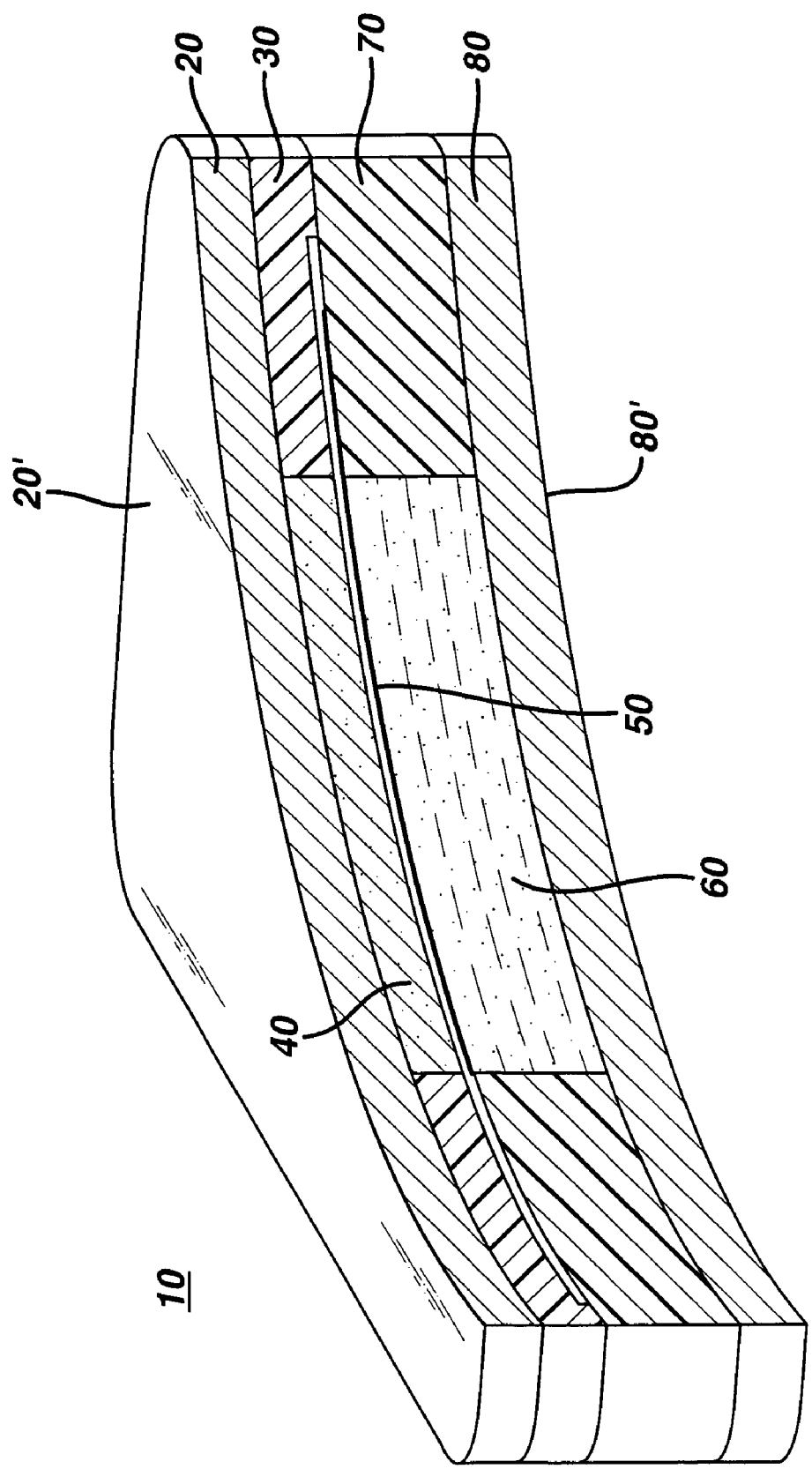
FIG. 1A is a cut away cross sectional view of an embodiment of the wafer cell of FIG. 1 having a dual frame construction.

After the cell's laminar structure is formed, for example, as shown in FIG. 1A, one or more plastic film bands can be applied to the cell's surface. The bands are preferably of heat shrinkable plastic material, desirably of polyvinylchloride film. As shown in FIG. 8A the exterior of the cell, with the exception of the cell terminal contact areas 25 and 26, is first covered with a 1st exterior layer of sealant 120 (Adhesive-Sealant B as described below). A first heat shrink wrap, namely, peripheral shrink plastic film band 210 is then applied around the peripheral edge of the cell (FIG. 8B). Band 210 is preferably formed of a closed body surface 211 defining a hollow interior 212. As film band 210 is heat shrunk onto the cell's surface, body 211 of film band 210 folds onto the cell surface and adheres to the 1st exterior sealant layer 120 (FIG. 8C). A portion of the sealant 120 is left exposed at the center (FIG. 8C) except at the terminal contact area 25. A 2nd layer of exterior sealant 121 (Adhesive-Sealant B as described below) is applied to the outer surface of peripheral shrink plastic band 210, excepting that such sealant 121 may be optionally omitted from the peripheral edges of the cell. A second heat shrink wrap, namely, lateral shrink plastic film band 220, is then applied perpendicular to the peripheral shrink plastic band 210, covering the remaining exposed laminar surfaces 20' and 80'. As lateral film band 220 is heat shrunk onto the cell's surface, it comes in contact with the second sealant layer 121. The lateral band 220, thus becomes adhered to the 2nd sealant layer 121, which was applied over the peripheral band 210. Lateral band 220 also becomes adhered to the exposed portion of first sealant 120 (FIG. 8C), which was applied to the laminar surfaces 20' and 80' but was left uncovered by the peripheral band of shrink plastic 210. The lateral band 220, is provided with a hole 222 which exposes a terminal contact areas 25 and a like hole (not shown) on the opposite face of band 220 which exposes an opposite terminal contact area 26, on the laminar surfaces 20' and 80'. In the specific embodiment shown, for example in FIG. 2, the terminal contact area 25 provides the cell's negative terminal and opposing contact area 26 provides the positive terminal. A small portion of lateral band 220 provides a small aperture or window 224 at open ends of band 220 after band 220 has been shrunk onto the peripheral band 210. A small portion of the underlying peripheral band 210 is shown exposed through window 224 (FIG. 8E).

Preferably the overall thickness of cell 10 is small, for example, between about 0.5 and 6 mm, for example, between about 1.5 and 6 mm, more typically between about 1.5 and 4 mm.

Figure 2:
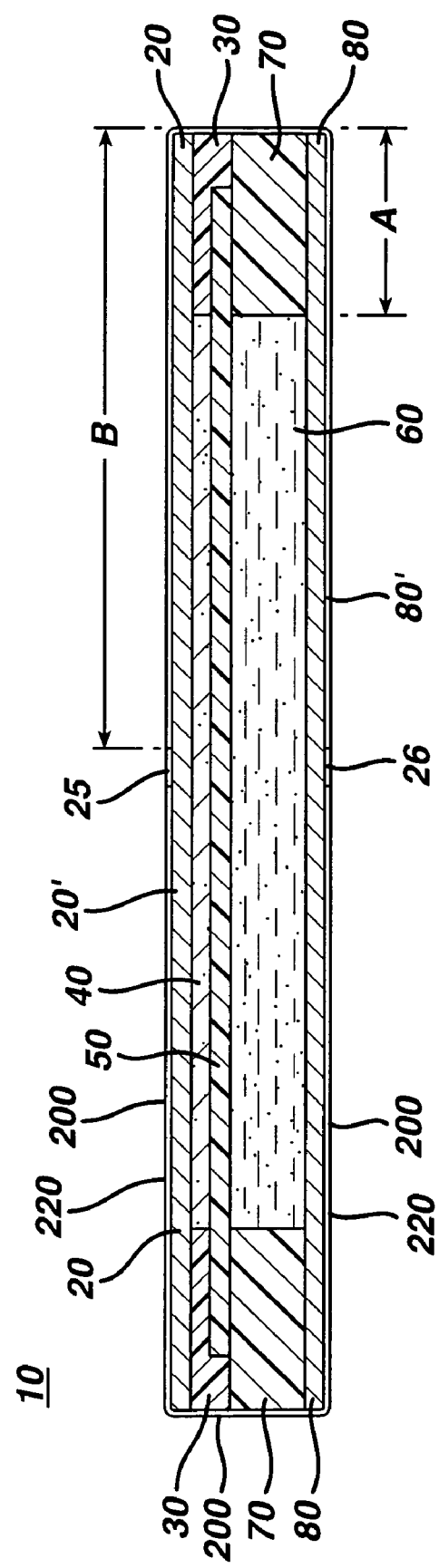
FIG. 2 is cross sectional elevation view of the cell of FIG. 1 taken along site lines 2-2.
Figure 3:
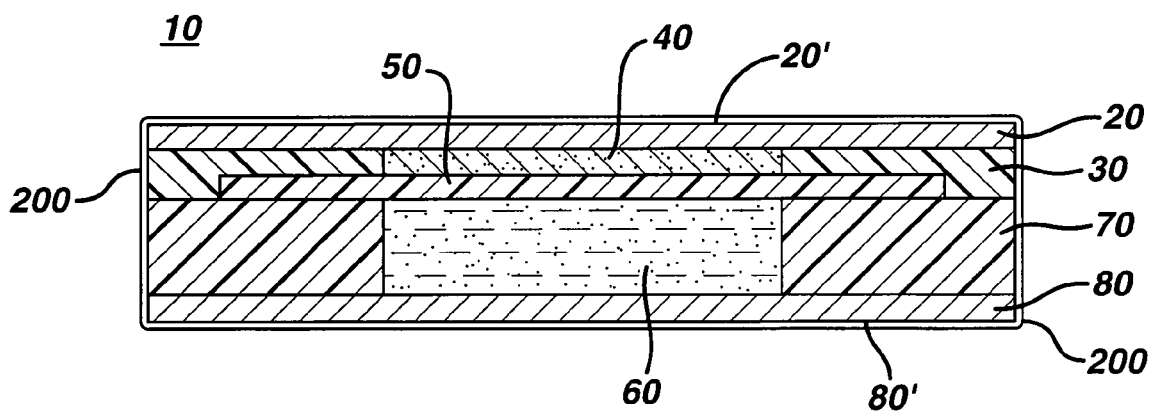
FIG. 3 is cross sectional elevation view of the cell of FIG. 1 taken along site lines 3-3.
Figure 4A:
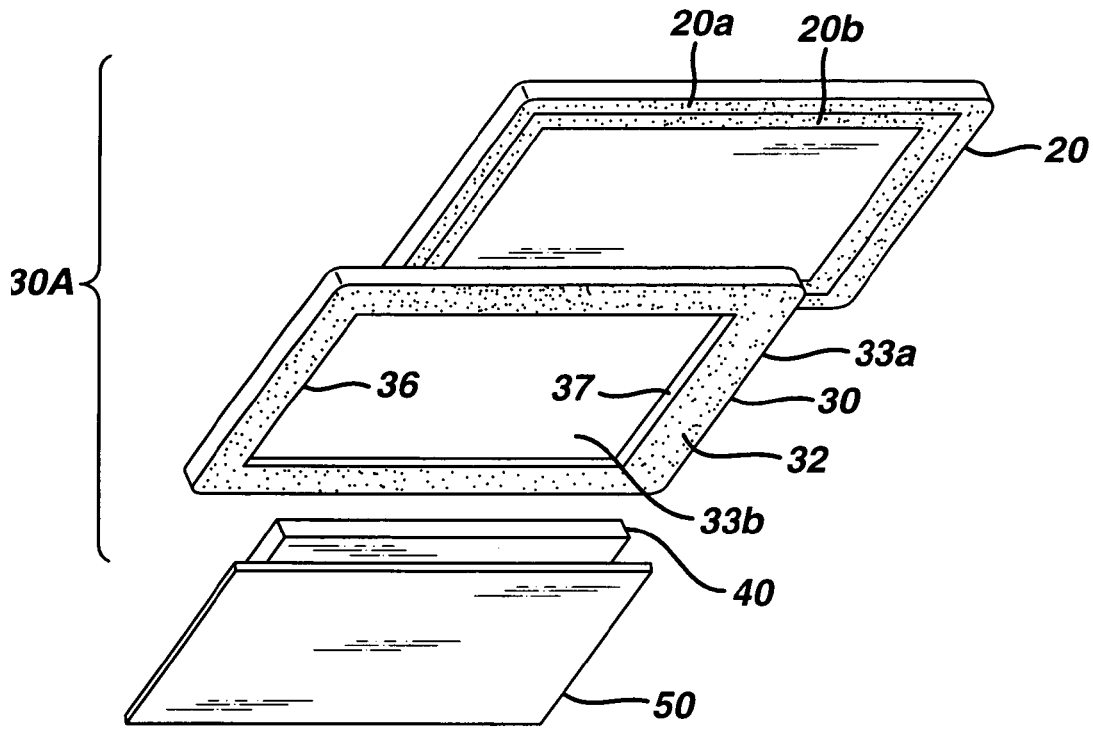
FIG. 4A is an exploded view of an embodiment showing components comprising an anode assembly.
Figure 4B:
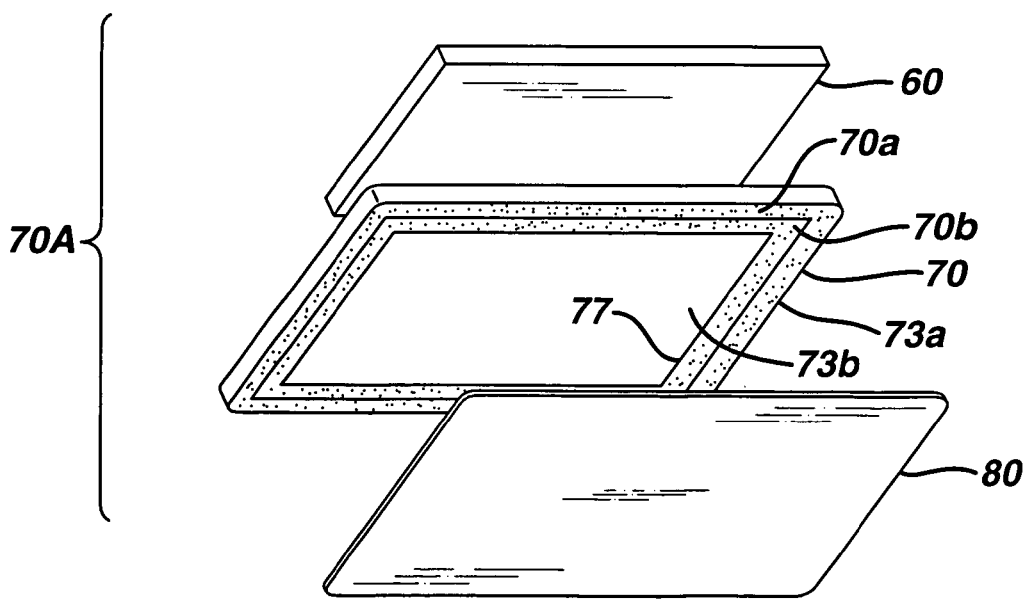
FIG. 4B is an exploded view of an embodiment showing components comprising a cathode assembly.

A specific construction of cell 10 (FIG. 1) is shown in the cutaway drawing of FIG. 1A along with side and end cross sections FIGS. 2 and 3, respectively. Cell 10 is characterized by first forming an anode assembly such as assembly 30A (FIG. 4A) and then a cathode assembly such as assembly 70A (FIG. 4B). Anode assembly 30A and cathode assembly 70A are then bonded to each other, preferably by adhesives to form the completed cell. The completed cell is preferably coated with sealant and wrapped, preferably twice, in a heat shrinkable plastic film 200, preferably of polyvinylchloride. Heat is applied to plastic film 200 to form the cell's label. Other types of outer film wraps 200 can be used, for example, adhesively coated plastic films and heat shrinkable poly-olefins or polyethylene terephthalate (PET) films. As above described the outer film wrap 200 preferably comprises a double wrap, namely, a first film band 210 applied around the peripheral edge of the cell and a second wrap 220 applied laterally over the first film 210.

Adhesives or sealants are coated onto or applied to various components at preferred locations. The general type of adhesive and sealants are described and specific preferred ones are specified. However, it will be appreciated that substitutes for the specific adhesives and sealants are possible and accordingly it is not intended that the invention be limited to those given herein. There will be three types of adhesive/sealants used in forming the wafer cell 10 embodiments described herein.

Adhesive A: This is a structural adhesive primarily for imparting holding strength to the components being bonded. It is preferred to employ an epoxy based adhesive for adhesive A. A preferred epoxy adhesive, for example, may consist of a two component epoxy available under the trade designation 2216 from 3M Company. It may also be a single component, heat activated epoxy available under the trade designation non-metallic filled epoxy 2214 from 3M or a UV initiated acrylate adhesive available under the trade designation LC-1211 from 3M or a film adhesive available under the trade designation AF-111 Scotch-Weld film adhesive from 3M.

Adhesive-Sealant B: This is a tacky adhesive which helps to bond components together and also functions as a sealant as well, namely, to seal out and block penetration of alkaline electrolyte. The adhesive-sealant B is preferably applied as a solvent based solution comprising a tacky polyamide. Alternatively, the sealant B may comprise a functionalized polyethylene which is a polyethylene with grafted side groups. A preferred functionalized polyethylene adhesive-sealant is available under the trade name J-43 adhesive from Haerbin Renown Tech. Co. Ltd., China. Alternatively, it may be an asphalt. A preferred sealant B in the form of a solvent based solution comprising a polyamide resin is sold under the trade designation Specseal from Specialty Chemicals Co. Another preferred solvent based solution comprising a tacky polyamide resin is available under the trade names REAMID-100 and VERSAMID-100 (from Henkel Corp. or Cognis Corp.). Such adhesive component is desirably a low molecular weight thermoplastic polyamide resin. Preferred polyamide resins are available under the tradenames REAMID-100 and VERSAMID-100 (from Henkel Corp. or Cognis Corp.). These resins are gels at room temperature that are dimerized fatty acids with molecular weights around 390 and are the reaction products of dimerized fatty acids and diamines. Although higher molecular weight polyamide based adhesive components can be used, the lower weight components are preferred since they are more readily dissolved in the preferred solvent of choice. The adhesive component is dissolved in a solvent to the desired viscosity. Various solvents can be used, such as isopropanol or toluene, as well as mixtures of solvents. Preferably isopropanol is used as the solvent because of its relatively harmless nature when handled. The polyamides have an additional advantage in that they resist chemical attack by potassium hydroxide electrolyte. The adhesive can be applied to cell components employing conventional spray coating techniques including by jet spray method. The adhesive can be applied to provide an adhesive seal between desired surfaces of polymer components, between surfaces of metallic components or between surfaces of polymer and metallic components for the cell.

Adhesive C: This adhesive is used primarily for bonding two plastic components of same or similar plastic material. The preferred adhesive then also has the same polymer base as the plastic material being bonded. For example, if the plastic material being bonded is of high impact polystyrene (HIPS) then the preferred adhesive also contains a polystyrene adhesive resin. Such adhesive can be conveniently applied in the form of a solvent based solution comprising the adhesive resin dissolved in suitable solvent.

In the course of describing the specific embodiments of the invention, the adhesives will be given by reference to the designated adhesive A, B or C as above, unless otherwise indicated.

A preferred anode assembly 30A (FIG. 4A) comprises an anode frame 30, preferably of plastic, having an outer peripheral edge 33a and an inner peripheral edge 37. Inner peripheral edge 37 surrounds a hollow interior space 33b. Anode frame 30 is preferably comprised of a plastic material which is durable, yet flexible and adhesive bondable. A preferred material for frame 30 is high impact polystyrene (HIPS), acrylonitrile-butadiene-styrene (ABS), polysulfone, or polyvinyl-chloride (PVC) plastic. Anode assembly 30A also comprises anode material 40, an anode current collector sheet 20, and separator sheet 50. Optionally the separator sheet may be included as part of the cathode assembly 70A or as a separate entity between the anode and cathode assemblies. In assembly, current collector sheet 20 may be adhesively bonded to the backside of frame 30 (FIG. 4A). In such embodiment (FIG. 4A) the frame 30 and anode current collector sheet 20 bonded thereto in effect form a housing for anode material 40. A preferred current collector sheet 20 is of copper. Sheet 20 is desirably between about 6 and 8 mil (0.152 and 0.203 mm) in thickness. The current collector sheet 20 is preferably secured and sealed to the backside edge 33a of frame 30 by employing a staged seal, consisting of a band of structural adhesive 20a (Adhesive A described above) adjacent to the outer edge of the frame and a band of sealant material 20b (Adhesive-Sealant B described above) adjacent to the inner edge of the frame. A single adhesive of homogenous composition may be applied instead of the staged seal, however the staged seal is preferred because it provides a better system for sealing out electrolyte. Spacer beads can be incorporated into the structural adhesive to control the thickness of the adhesive layer. Then anode material 40 may be inserted into the interior space 33b within frame 30 so that it lies pressed against current collector sheet 20. Frame 30 may be provided with a recessed ledge 36 forming the inside edge of the frame. Recessed ledge 36 is preferably coated with adhesive 37. Adhesive 37 may be a solvent based contact adhesive, for example, contact adhesive available under the trade designation 1357-L from 3M Company or a water-based contact adhesive available under the trade designation 30-NF from 3M. A preferred solvent base adhesive for application to ledge 36 comprises a solution of 10 wt. % high impact polystyrene and 90 wt. % toluene. A separator sheet 50 may be inserted over the anode material 40 so that its edge lies against ledge 36 and is bonded thereto by the adhesive coating 37. Alternatively, the edge of separator sheet 50 may be welded to ledge 36 by ultrasound or heat and pressure welding technique. The completed anode assembly 30 is thus in the form of a laminate structure containing the anode material 40 pressed against current collector sheet 20, with the current collector sheet 20 and separator 50 bonded to opposite sides of frame 30.

A preferred cathode assembly 70A (FIG. 4B) comprises a cathode frame 70, preferably of plastic, having an outer peripheral edge 73a and an inner peripheral edge 77. Inner peripheral edge 77 surrounds a hollow interior space 73b. Cathode frame 70 is preferably comprised of a plastic material which is durable, yet flexible and adhesive bondable. A preferred material for frame 70 is high impact polystyrene, acrylonitrile-butadiene-styrene, polysulfone, or polyvinylchloride plastic. Cathode assembly 70A also comprises cathode material 60, and a cathode current collector sheet 80. The cathode current collector sheet 80 is desirably a nickel plated steel sheet, preferably nickel plated steel with a carbon layer over the nickel. The steel sheet may typically be of cold rolled steel. Another suitable cathode current collector sheet 80 may be a nickel plated steel sheet with a cobalt layer over the nickel layer and a carbon paint layer over the cobalt as disclosed in U.S. Pat. No. 6,555,266 B1. Another suitable cathode current collector is a pure nickel sheet, etched and carbonized and coated with a carbon paint coating. The nickel sheet may desirably have a thickness of between about 6 to 8 mil (0.152 and 0.203 mm). The carbon coating on the nickel sheet may be applied by solvent based coating technique, for example, as described in U.S. Pat. No. 6,555,266. The nickel sheet may be carbonized by passing the sheet through a furnace operating at high temperatures wherein carbon deposits onto the nickel surface from a volatilized carbon precursor. This latter technique of depositing carbon onto the nickel surface to form a carbonized nickel surface is described in U.S. Pat. No. 2,051,828 (William F. Dester, Aug. 25, 1936). The use of carbonized nickel current collectors in alkaline cells is described in U.S. Pat. No. 3,713,896 (Ralph H. Feldhake, Aug. 19, 1970).

In assembly, current collector sheet 80 may be adhesively bonded to the backside of frame 70 (FIG. 4B). In such embodiment (FIG. 4B) the frame 70 and cathode current collector sheet 80 bonded thereto in effect form a housing for cathode material 60. Current collector sheet 80 may be bonded to the backside edge 73a of frame 70 preferably by employing a staged seal, consisting of a band of structural adhesive 70a (Adhesive A as described above) adjacent to the outer edge of the frame and a band of sealant material 70b (Adhesive-Sealant B as described above) adjacent to the inner edge of the frame. A single adhesive of homogenous composition may be applied instead of the staged seal, however the staged seal is preferred because it provides a better system for sealing out electrolyte. Then cathode material 60 can be inserted into the interior space 73b within frame 70 so that it lies pressed against current collector sheet 80. The completed cathode assembly 70a is thus in the form of a laminate structure containing the cathode material 60 pressed against current collector sheet 20 but, with a portion of the cathode material 60 exposed.

The anode assembly 30A may then be adhesively secured to the cathode assembly 70A to form a single laminate cell structure 10 with anode 40 and cathode 60 material facing each other and separator 50 therebetween (FIG. 1A). Anode assembly 30A and cathode assembly 70A are conveniently bonded together by applying adhesive to the exposed edge 33a of the anode frame 30 (FIG. 4A). The anode frame edge may typically be between about ⅛ to ¼ inch in width which allows enough room for the adhesive to be applied. The adhesive 32 desirably contains an adhesive resin which is from the same class as the plastic material of frame 30. Thus, if frame 30 is of high impact polystyrene the preferred adhesive 32 is a solution of high impact polystyrene in toluene. Alternatively, if the frame is made from ABS (acrylonitrile-butadiene-styrene) or PVC (polyvinylchloride), a solution of these plastic polymers in toluene or other solvent may be employed. After the adhesive 32 is applied to edge 33a of the anode frame 30, the anode frame 30 is pressed onto cathode frame 70 thus adhesively bonding the anode assembly 30A to the cathode assembly 70a to form a bonded laminate structure forming the completed cell 10 shown in FIGS. 1-3. The completed cell 10 shown best in FIGS. 1A, 2 and 3 is rigid, sturdy, and compact. The bonded laminate cell construction results in a tightly sealed cell, which retains the cell contents therein. As shown in FIGS. 2 and 3 the cell may be coated with one or two layers of sealant and wrapped in one or two layers of plastic film, which is preferably a heat shrinkable film of polyvinylchloride. When heat is applied to the film it shrinks around the cell's boundary surface to form a label.

An aspect of the present invention is to design the cell so that there is provided a long leak path for any electrolyte from the cell interior to traverse before it reaches an exterior point of escape. (This is in addition to providing the above described adhesives and adhesive sealants to the various cell components.) Thus, the wafer cell 10 of the invention is designed so frames 30 and 70 (or frame 130 in the case of the single frame embodiment shown in FIGS. 7A and 7B) have a frame edge width (e.g. between edges 33a and 37 shown in FIG. 4A or between edges 73a and 77 shown in FIG. 4B or between edges 130a and 137 shown in FIG. 7B) which is preferably at least as great as the total cell thickness. This provides a relatively long first leak blockage path "path A" for electrolyte to traverse from the cell interior to the outer end of the frame as shown, for example, in FIG. 2. Then the outer heat shrinkable film wrap 200 (which may comprise double film wraps 210 and 220 as shown in FIGS. 8A-8E) provides a second leak blockage path "path B". The blockage path B is defined as the distance from an exposed terminal contact (e.g. terminal contact 25) located on a conductive endplate (e.g. end plate 20) at a distance "B" (FIG. 2) from the outer peripheral edge of the frame (e.g. frame 30), which is at least a distance as long as the frame width, namely, a distance approximately equal to or greater than the cell thickness. In this context the total electrolyte leakage block path A+B (FIG. 2) is preferably at least twice the cell thickness. It will be appreciated that the same definitions to the leakage block paths A and B apply as well to the single frame 130 embodiment of the invention shown in FIGS. 7A and 7B.

Preferred discharge rates for cell 10 of the invention, for example, may be as great as about 15 to 45 milliwatts per $cm^2$ (13.5 to 40.5 milliAmp per $cm^2$). (The square centimeter area is based on the area at the anode/cathode interface.) A typical wafer cell 10 of overall dimensions 4 cm width×8 cm length×3 mm thick may accommodate a current drain rate of between about 1 and 1,000 milliAmp, preferably between about 10 milliAmp and 100 milliAmp.

Figure 5A:
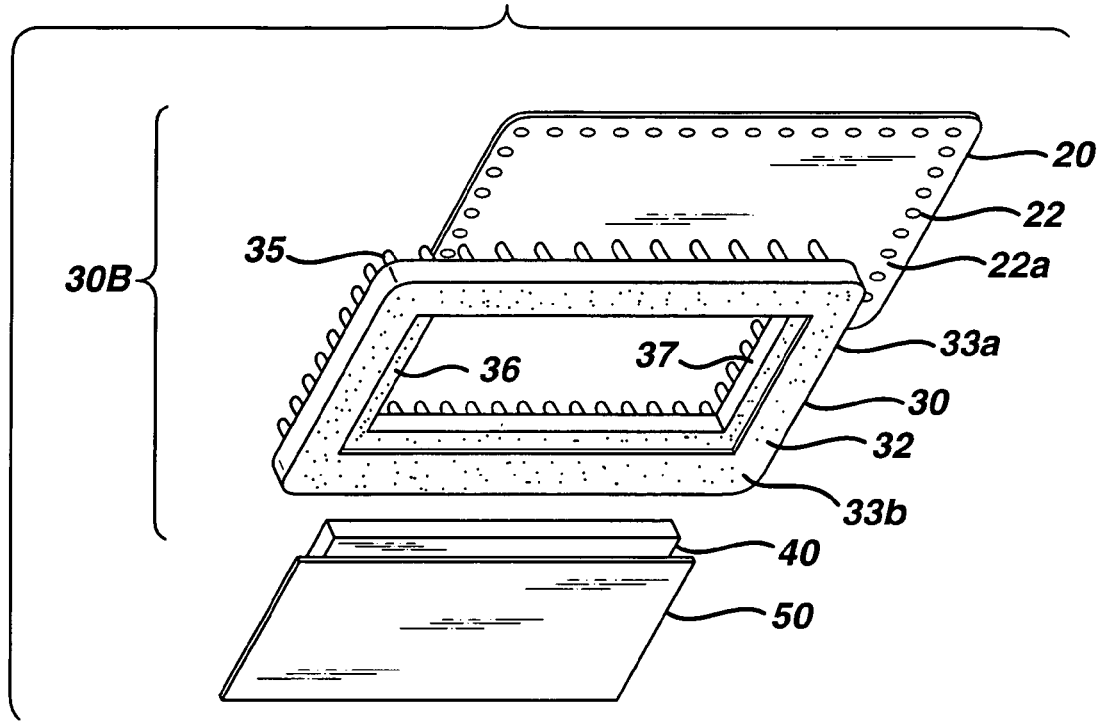
FIG. 5A is an exploded view showing components comprising a riveted anode assembly.
Figure 5B:
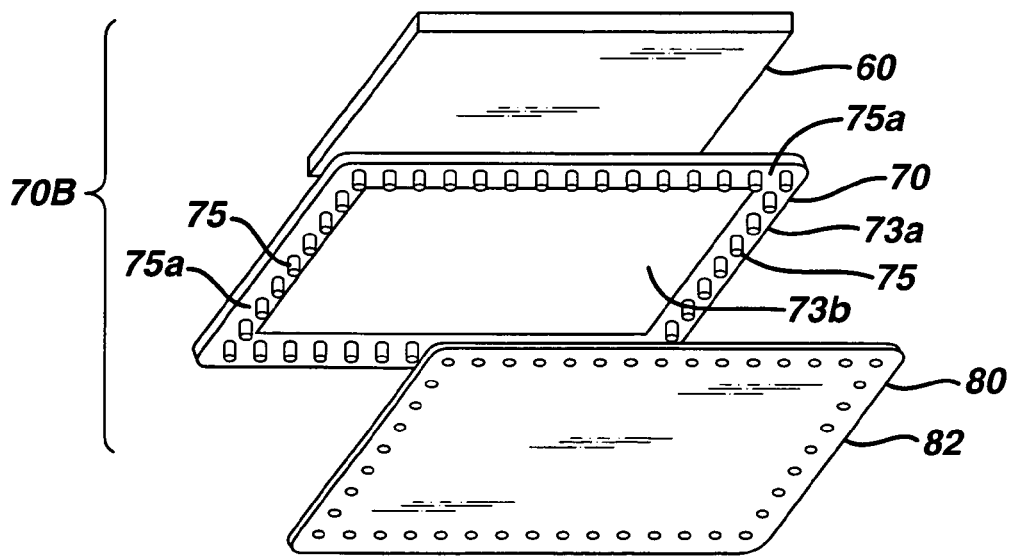
FIG. 5B is an exploded view showing components comprising a riveted cathode assembly.
Figure 6A:
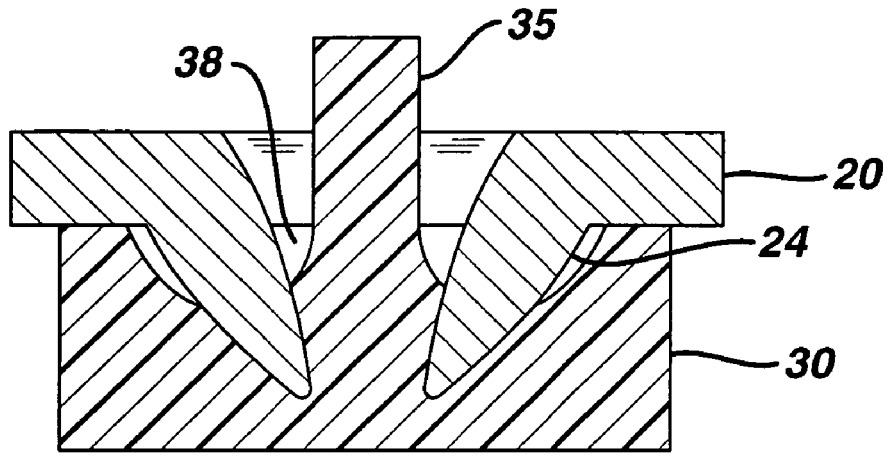
FIG. 6A is a cross section of the anode assembly of FIG. 5A showing rivets protruding from the anode plastic frame passed through apertures in the anode current collector sheet.
Figure 6B:
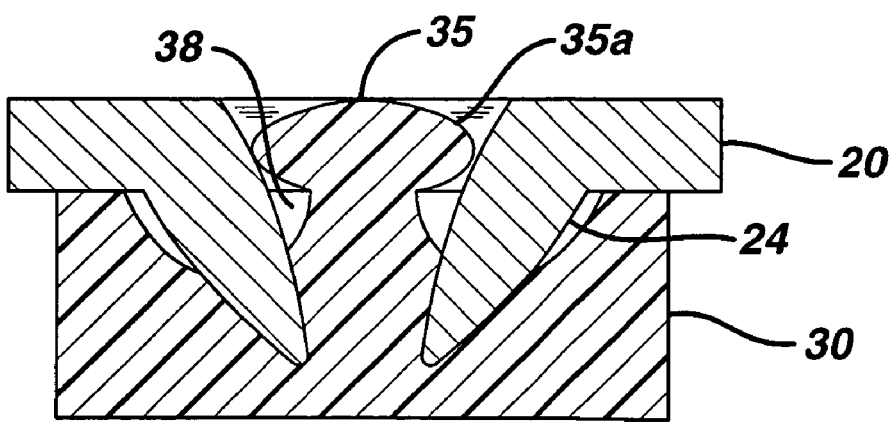
FIG. 6B is a cross section of the anode assembly of FIG. 5A showing the rivet heads laminated to lie below the surface of the anode current collector sheet.

In an alternative embodiment as shown in FIGS. 5A and 5B the structural integrity of the completed cell may be enhanced by integrally molding the anode frame 30 and cathode frame 70 to include protruding rivets along the respective frame edges 33a and 73a. Such integrally molded rivets 35 are shown protruding from the back edge of the anode frame 30. Likewise, integrally molded rivets are shown protruding from the back edge of cathode frame 70. The anode current collector sheet 20 is provided with apertures 22 along its edge to mate with protruding rivets 35 on the anode frame 30. Likewise, the cathode current collector sheet 80 may be provided with apertures 82 along its edge to mate with protruding rivets 75 on the cathode frame 70. Thus, the anode current collector sheet 20 may be secured to anode frame 30 by inserting the rivets 35 through the apertures 22, and cathode current collector sheet 80 may be secured to the cathode frame 70 by inserting the rivets 75 through the apertures 82. The rivet heads may then be peened (laminated) by applying heat and pressure to them. Desirably a sealant may also be applied to the spaces between the rivet apertures 22 on the anode current collector sheet and spaces between the rivet apertures 82 on the cathode current collector sheet. A preferred sealant for such purpose may be a solvent based sealant having a sticky, functionalized polyethylene resin such that available under the trade designation J-43 Adhesive from Haerbin Renown Tech. Co. Ltd, China. In the embodiment shown in FIGS. 6A and 6B the protruding rivets 35 along the anode frame may have recessed bases protruding from shallow indented spaces 38 along the edge of the anode frame 30. Such configuration allows the rivet heads to recede to a level below the surface of the anode current collector sheet 20 after they are inserted into the current collector sheet apertures 22 and laminated. The same recessed rivet head configuration may be employed for rivets 75 protruding from the cathode frame 70.

The cell 10 has been made in accordance with embodiment shown in FIGS. 4A and 4B as well as the riveted embodiment shown in FIGS. 5A and 5B. In a specific construction employing the anode and cathode assemblies shown in FIGS. 4A and 4B, the cell had an overall thickness of 2.8 mm and a width of 1.5 inch (38.1 mm) and length of 1.5 inch (38.1 mm). The cell was discharged at various constant rates between 77.5 and 0.775 milliwatts/$cm^2$ to a cut off voltage of about 0.6 Volts (area based on the interfacial area between anode and cathode). The average load voltage was about 1.1 Volt during the discharge cycle to about 0.6 Volt cut off. Thus, the above Watt density range translates to a current drain density of between about 70.5 to 0.705 milliAmp/$cm^2$. In this range of discharge the cell bulged to a thickness of up to about 10 percent of its original thickness. The cell did not rupture, nor was there any leakage of electrolyte. In order to assure that the cell does not expand too tightly within an electronic device's battery cavity, it is recommended that such cavity be designed sufficiently larger than the cell or the cell be designed sufficiently smaller in thickness than the cavity opening to allow for a nominal 10 percent cell expansion.

In another preferred wafer cell embodiment (FIGS. 7A and 7B) a single frame 130 may be employed instead of the two frames 30 and 70 shown in the embodiment of FIGS. 4A and 4B. The single frame construction, preferably of plastic, has the advantage that the anode material 40 and cathode 60 can be packed into opposite sides of single frame 130 avoiding the need to bond individual frames together. The single frame 130 shown best in FIG. 7B, has an inner peripheral edge 132 surrounding a hollow interior space 133b. In the context of the single frame embodiment shown in FIGS. 7A and 7B the anode assembly comprises the anode current collector 20, anode 40, separator 50 and top side of frame 130. The cathode assembly comprises cathode current collector 80, cathode 60, and lower side of same frame 130. The anode current collector 20 and cathode current collector 80 are bonded to opposite sides of the frame, 130, to form a laminar cell construction.

Figure 7B:
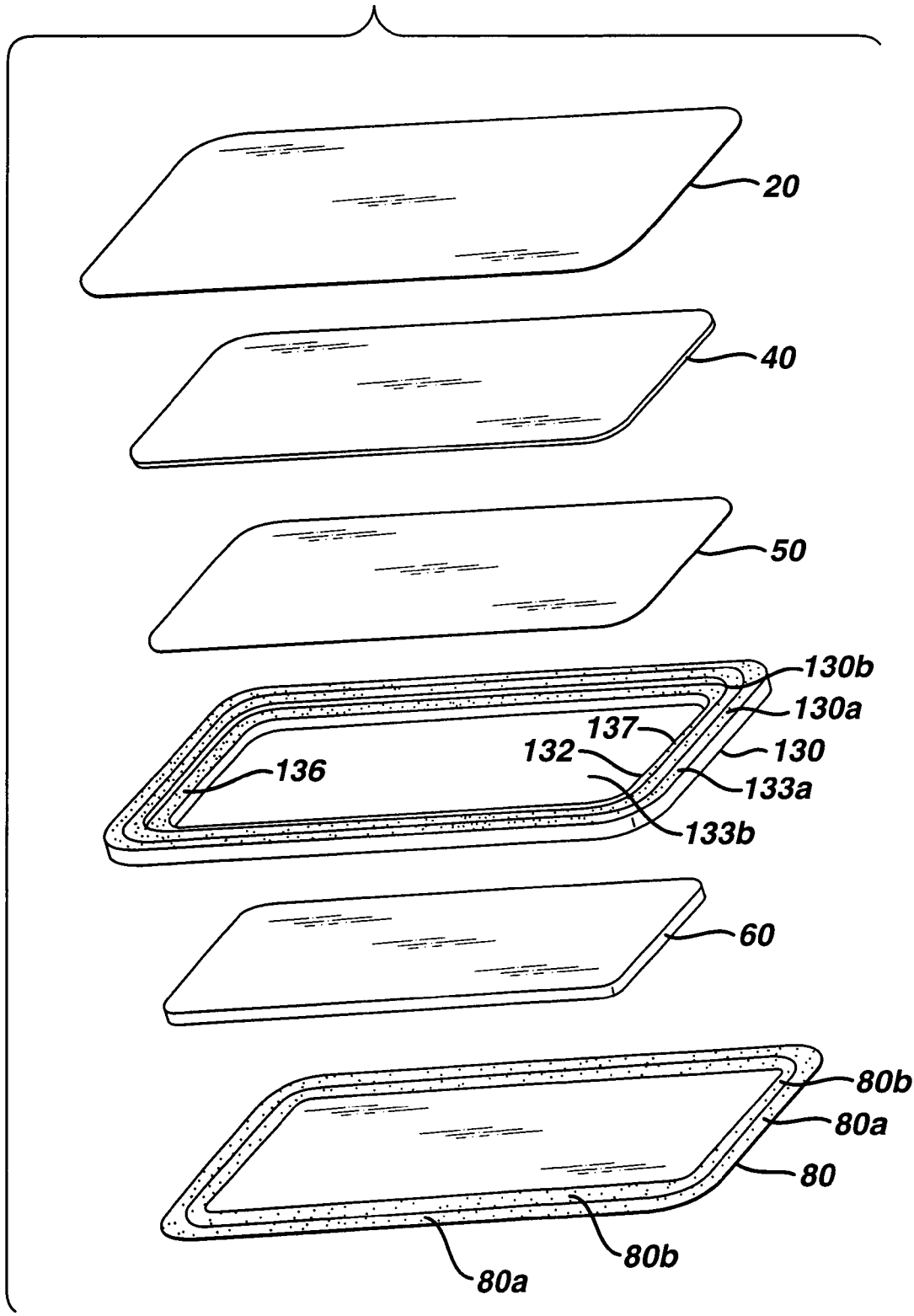
FIG. 7B is an exploded view of the wafer cell embodiment of FIG. 7A showing components comprising the anode and cathode assembly.

To effect cell construction for the embodiment employing a single frame (FIGS. 7A and 7B), adhesive 137 is applied to recessed ledge 136 along the inside edge of frame 130 (FIG. 7B).

Adhesive 137 may be a solvent based contact adhesive, for example, contact adhesive available under the trade designation 1357-L from 3M Company or a water-based contact adhesive available under the trade designation 30-NF from 3M). A preferred solvent base adhesive for application to ledge 136 comprises a solution of 10 wt. % high impact polystyrene and 90 wt. % toluene.

Separator sheet, 50, is bonded to recessed ledge 136 by contact adhesive 137. Alternatively, the separator sheet 50, may be welded directly to recessed ledge 136 by heat and pressure, or by ultra-sonics, without employing an adhesive.

Cathode 60 is pressed onto the exposed side of separator sheet 50. The cathode current collector sheet 80 is then applied over cathode 60 so that the edge of current collector sheet 80 contacts the edge of frame 130. The staged adhesives 80a and 80b hold the cathode current collector 80 securely bonded to the underside of frame 130 as may be inferred from FIGS. 7A and 7B.

Anode, 40 is extruded or pressed onto the opposite exposed side of separator sheet 50. The anode current collector sheet, 20, is then applied over anode, 40, so that the edge of the current collector sheet 20 contacts the edge of the frame 130. The staged adhesives, 130A and 130b hold the anode current collector 20 securely bonded to the topside of frame 130 as in FIG. 7A.

A staged seal preferably is applied along the edge 133a of frame 130. The staged seal may comprise a band of structural adhesive 130a (Adhesive A as described above) adjacent to the outer edge of the frame and a band of sealant material 130b (Adhesive-Sealant B) (adjacent to the inner edge of the frame). A single adhesive of homogenous composition may be applied along surface 133a of frame 130 instead of the staged seal, however, the staged seal is preferred because it provides a better system for sealing out electrolyte.

A similar staged adhesive may be applied to the opposite side of frame 130 or along the edge of cathode current collector sheet 80. The latter is shown in FIG. 7B. The staged adhesive comprises a structural adhesive 80a (Adhesive A as described above) adjacent to the outer edge of cathode current collector sheet 80 and a band of sealant material 80b (Adhesive-Sealant B) adjacent to the inner edge of cathode current collector sheet 80. A single adhesive of homogenous composition may be applied instead of the staged adhesive, however, the staged adhesive is preferred because it provides a better system for sealing out electrolyte.

By way of a nonlimiting example, for a wafer thin cell 10 (4 mm thickness) having a footprint size of 1.5 inch by 3.0 inch (38.1 mm×76.2 mm) a typical operating current drain may be between about 1 milliAmp to about 2,000 milliAmp, typically between about 10 and 250 milliAmp, more typically between about 10 and 100 milliAmp. It will be appreciated that in general larger size cells 10 of the invention (in terms of their anode/cathode interfacial area, not thickness) will allow the cell to exhibit good performance at higher and higher current drain demands.

In the case of certain types of zinc powder alloys, zinc particle sizes and with certain types of anode current collectors, the anode may produce hydrogen gas faster than it can diffuse to the cathode and be oxidized by the cathode material to form water. Thus, some form of gas management system may be required. In particular, a system to vent the accumulated hydrogen gas may be needed. This could for example take the form of a tube of gas permeable polymer having a porous insert disposed throughout its length, the tube traversing the anode cavity and terminating beyond the outer edge of the plastic frame, similar to that disclosed by Polaroid Corporation in U.S. Pat. No. 4,105,831.

Chemical Composition of a Representative Cell

The following description of cell composition regarding chemical composition of anode 40, cathode 60 and separator 50 is applicable to the representative wafer cell 10 disclosed in the above described embodiment.

In the above described cell 10, the cathode 60 comprises manganese dioxide and electrolyte, and an anode 40 comprises zinc, gelling agent and electrolyte. The aqueous electrolyte comprises a conventional mixture of KOH and zinc oxide. The anode material 40 can be in the form of a gelled mixture containing mercury free (zero-added mercury) zinc alloy powder. That is, the cell has a total mercury content less than about 100 parts per million parts (ppm) of zinc by weight, preferably less than 50 parts mercury per million parts of zinc by weight. The cell also preferably does not contain any added amounts of lead and thus is essentially lead-free, that is, the total lead content is less than 30 ppm, desirably less than 15 ppm of the total zinc in the anode. Such mixtures can typically contain aqueous KOH electrolyte solution, a gelling agent (e.g., an acrylic acid copolymer available under the tradename CARBOPOL C940 from Noveon (formerly from B.F. Goodrich)), and surfactants (e.g., organic phosphate ester-based surfactants available under the tradename GAFAC RA600 from Rhône Poulenc). Such a mixture is given only as an illustrative example and is not intended to restrict the present invention. Other representative gelling agents for zinc anodes are disclosed in U.S. Pat. No. 4,563,404.

The cathode 60 for application to cell 10 of the invention is desirably a soft or semisolid cathode of the type described in U.S. Pat. No. 6,207,322 B1 incorporated herein by reference. However, it will be appreciated that more conventional solid manganese dioxide cathodes, e.g., having manganese dioxide content between about 87 and 93 percent by cathode weight could also be used. Nevertheless, it has been determined that the soft or semisolid cathode is desirable for application to the wafer cell of the invention because it can be readily molded into the cavity 73b within cathode frame 70. Moreover, such soft or semisolid cathode in the context of the adhesively secured cell of the invention is preferred, since it has been found to maintain close and uniform contact with the exposed surface of the cathode current collector 80 during the life of the cell. In the adhesively laminated cell 10 of the invention there are no strong compressive forces to hold a solid cathode in close and uniform contact with the cathode current collector and such contact may relax somewhat with time. Thus the soft or semisoft cathode is preferred.

The term "semisolid" as used herein is intended to broadly cover all physical states which are intermediate in property between true solid and true liquid. Thus, the term semisolid is intended to include (for example, but not by way of limitation) physical states having the soft texture and rheological properties commonly associated with putties' and pastes. The semisolid material as used herein includes (for example, but not by way of any limitation) materials that are not free flowing as is a liquid but generally requires an external force in order to cause the material to move through a conduit. The term semisolid is also intended (for example, but not by way of any limitation) to apply to materials which are extrudable and which can be deformed without fracturing upon exertion of external pressure.

The desired semisolid cathode 60 for use in the wafer cell of the present invention can have the properties and range of composition as described in U.S. Pat. No. 6,207,322 B1 incorporated herein as follows:

Thus, the semisolid cathode 60 for cell 10 of the invention desirably comprises manganese dioxide in amount which is less than 80 percent by weight of the cathode and preferably between about 40 and 80 percent by weight, typically between about 45 and 78, more typically between about 45 and 70 percent by weight of the cathode. The semisolid cathode comprising manganese dioxide may be in the form of a putty or paste or a highly viscous material having a measurable viscosity.

The soft cathode 60 typically comprises $MnO_2$ (EMD) between about 45 and 78 wt. % of the cathode, more typically between about 45 and 70 percent by weight of the cathode, carbon black (Shawingan acetylene black or more preferably a graphitized carbon black such as MM 131 or MM 179 from Timcal, Belgium, as described in WO9703133), and aqueous KOH electrolyte solution (7-9 Normal). Preferably a small amount of graphite is also added. Advantageously, the carbon black preferably comprises between about 4 and 15 percent by weight of the semisolid cathode. The carbon black increases the conductivity of the semisolid cathode and provides an internal network to maintain the cathode in a semisolid state. The carbon black also acts as an electrolyte absorber and immobilizes the alkaline electrolyte solution so that free, fluid electrolyte is not evident. The graphite may comprise between about 1% and 8% weight percent of the cathode and improves the cathode conductivity. Desirably the semisolid cathode of the invention also comprises electrolyte solution comprising potassium hydroxide. The semisolid cathode may also comprise a binder such as polytetrafluroethylene, desirably comprising between about 0 and 2 percent by weight of the cathode. Optionally, less than 2 wt. % of a clay such as Laponite RDS clay from Southern Clay Products Company may be added to adjust the consistency.

The semisolid cathode 60 may have a porosity between about 30 and 70%, preferably between about 35 and 70%, more preferably between about 40 and 70%. Porosity here is taken to mean the volume fraction of the cathode comprised of non-solid materials, i.e. electrolyte+air. The semisolid cathode 60 may desirably also have a higher electrolyte content as a weight percent of total cathode than conventionally employed in solid $MnO_2$ containing cathodes for alkaline cells. The semisolid cathode material 60 may have a KOH content (pure) of between about 6 and 18 percent by weight of total cathode material and a total water content between about 9 and 27 percent by weight. The term KOH (pure) as used herein and in the examples with respect to KOH is the pure, anhydrous KOH content (i.e., without water) for calculation purposes.

The cathode porosity may be calculated by determining the volume occupied by electrolyte, other liquids and entrapped air (including volume of liquid and air entrapped within the pores of solids) and dividing that volume by the apparent volume of the cathode and multiplying by 100. (The apparent volume is the overall volume of a sample as contained within the external boundary of the sample.) The cathode porosity may be conveniently calculated by first obtaining the real density of each of the solids by conventional helium displacement method, before the solids are mixed into the cathode. (The real density of each solid is the solid sample weight divided by its real volume, that is, the solids sample apparent volume reduced by the volume occupied by entrapped air.) The respective weight of solids to be mixed into the cathode is then divided by their respective real densities to obtain the real volume of the solids in the cathode. The real volume of the solids is subtracted from the apparent volume of the cathode as a whole and this difference is divided by the cathode apparent volume×100 to yield porosity, percent.

The electrolytic manganese dioxide typically has an average particle size between about 1 and 100 micron, desirably between about 20 and 60 micron. The graphite is typically in the form of natural, synthetic or expanded graphite or mixtures thereof. The graphite can also comprise graphitic carbon nanofibers alone or in admixture with natural, synthetic or expanded graphite. Such cathode mixtures are intended to be illustrative and are not intended to restrict this invention.

The anode material 40 comprises: Zinc alloy powder 62 to 72 wt % (99.9 wt % zinc containing 200 to 500 ppm indium as alloy and plated material), an aqueous KOH solution comprising 38 wt % KOH and about 2 wt % ZnO; a cross-linked acrylic acid polymer gelling agent available commercially under the tradename "CARBOPOL C940" from Noveon (e.g., 0.5 to 2 wt %) and optionally a hydrolyzed poly-acrylonitrile grafted onto a starch backbone commercially available commercially under the tradename "Waterlock A-221" from Grain Processing Co. (between 0.01 and 0.5 wt. %); organic phosphate ester surfactant RA-600 or dionyl phenol phosphate ester surfactant available under the tradename RM-510 from Rhone-Poulenc (between 10 and 100 ppm). The term zinc as used herein shall be understood to include zinc alloy powder which comprises a very high concentration of zinc, for example, at least 99.9 percent by weight zinc. Such zinc alloy material functions electrochemically essentially as pure zinc.

In respect to anode 40 of the laminar alkaline cell 10 of the invention, the zinc powder mean average particle size is desirably between about 1 and 350 micron, desirably between about 1 and 250 micron, preferably between about 20 and 250 micron. Typically, the zinc powder may have a mean average particle size of about 150 micron. The zinc particles in anode 40 can be of acicular or spherical shape. The bulk density of the zinc in the anode is between about 1.75 and 2.2 grams zinc per cubic centimeter of anode. The percent by volume of the aqueous electrolyte solution in the anode is preferably between about 69.2 and 75.5 percent by volume of the anode.

The cell 10 can be balanced in the conventional manner so that the mAmp-hr capacity of EMD (based on 410 mAmp-hr per gram EMD) divided by the mAmp-hr capacity of zinc (based on 820 mAmp-hr. per gram zinc) is about 1. However deep discharge bulging can be reduced by balancing the cell so that the cathode is in excess. Thus, cell 10 can be balanced so that the total theoretical capacity of the EMD divided by the total theoretical capacity of the zinc is between about 1.03 and 1.10, desirably between about 1.05 and 1.08, preferably around 1.07 to reduce cell bulging.

TEST CELL EXAMPLE 1

A test cell 10 of square configuration as shown in FIGS. 1-3 was prepared. The test cell 10 had a length of 1.5 inches (38.1 mm), a width of 1.5 inches (38.1 mm) and an overall thickness of 2.8 mm. The cell 10 was tested without any label 200 applied to the cell's outer surface. The anode 40 and cathode 60 had the following composition.

Anode Composition:

| | Wt. % |
|---|---|
| Zinc[1] | 69.9 |
| Surfactant[2] Solution (RM 510) | 0.12 |
| Electrolyte[3] (9 Normal KOH) | 29.98 |
| | 100.0 |

Notes:
[1] The zinc particles had a mean average particle size of about 150 micron and were alloyed and plated with indium to yield a total indium content of about 200 ppm.
[2] Organic phosphate ester-based surfactant solution RM 510 from Rhône Poulenc, 3% by wt. in $H_2O$.
[3] The electrolyte solution contained gelling agents Waterlock A221 and Carbopol C940 comprising in total about 1.5 wt. % of the electrolyte solution and about 2 wt. % ZnO.

Soft (Semisolid) Cathode Composition:

| | Wt. % |
|---|---|
| $MnO_2$ (EMD) (Trona D from Kerr McGee) | 63.0 |
| Carbon (Shawinigan Acetylene Black 50% compressed) | 5.0 |
| Graphite[1] (Grafmax MP12 du natural graphite) | 2.0 |
| Electrolyte (9 Normal KOH) | 30.0 |
| | 100.0 |

Notes:
[1] Grafmax MP12 du natural graphite from Nacional De Grafite.

The anode plastic frame was composed of HIPS (high impact polystyrene) plastic material and had thickness of about 0.76 mm. The cathode plastic frame was composed of HIPS plastic material and had thickness of about 1.52 mm. The separator 50 comprised a non-woven sheet of polyvinylalcohol fibers laminated to a cellophane film. The cathode had 1.61 grams of $MnO_2$. The anode, cathode, electrolyte and separator comprised about 37 percent of the external volume the cell.

The cell was discharged in the following manner which gives an indication of the cell's performance over a spectrum of power demands.

The fresh cell 10 was first discharged at a power drain of 500 milliwatts (454 milliAmp) to a cut off voltage of about 0.6 Volt. The measured capacity was 37.1 milliWatt-hrs. The cell was rested for 1 hour and the same cell was then discharged at a rate of 250 milliWatts (227 milliAmp) to a cut off voltage of 0.6 volt. The measured incremental capacity for this drain was 100.4 milliWatt hours. The cell was rested for 1 hour and the same cell was then discharged at a rate of 100 milliWatts (90.9 milliAmp) to a cut off voltage of 0.6 volt. The measured incremental capacity for this drain was 90.19 milliWatt hours. The same cell was then incrementally discharged at 15 milliWatts, 10 milliWatts, and 5 milliWatts to 0.6 Volt cutoff, with 1 hour rest between each discharge. The incremental capacities the last three discharges was 30.99, 106.28, and 8.87 milliWatt-hours, respectively.

After the discharge test was completed, the cell was examined for bulging and leakage. It was determined that the cell expanded by about 10 percent in overall thickness, that is from a thickness of about 2.8 mm to 3.1 mm. There was no discernible electrolyte leakage.

Utilizing the design principles herein disclosed, thin alkaline cells of very large area, e.g. 8.5 in×11 in or 93.5 $in^2$ (approx. 21.6 cm×27.9 cm or 603 $cm^2$) or larger may be constructed. Other embodiments of the invention involving more complex frame designs are within the concept of the invention. For example, wafer cells can also be constructed with interior partitions or ribs within the frames, thus subdividing the interior of the anode frame or cathode frame into multiple volumes. By attaching these interior ribs to the endplates with adhesives, staged seals (sealant coating and adhesive coating in side by side arrangement) or sealant plus rivets, the overall cell structure can be mechanically reinforced to give greater stiffness and resistance to flexure. This feature will be especially useful for cells having a large area, providing extra protection to the outermost, peripheral seals against failure due to shear or peeling, caused by bending or twisting of the cell envelope.

Although the preferred embodiments of the invention have been described with respect to specific embodiments it will be appreciated that other embodiments are possible and are within the claims.

What is claimed is:

1. A primary wafer alkaline cell comprising a negative and a positive terminal, an outer boundary surface covering said cell, and a pair of opposing sides comprising at least the majority of said boundary surface of said cell, said opposing sides defining a short cell dimension therebetween defining the cell thickness, said cell comprising an anode assembly and a cathode assembly bonded together forming a laminate structure, said anode assembly comprising an anode comprising zinc and aqueous alkaline electrolyte and said cathode assembly comprising a cathode comprising manganese dioxide and aqueous alkaline electrolyte;

wherein said anode assembly comprises a anode housing comprising an anode frame comprising plastic material, said anode frame having an inner peripheral edge defining the boundary of an anode cavity for housing said anode, an outer peripheral edge defining the outer boundary of the anode frame, wherein said anode frame has a front side and opposing back side comprising said peripheral edges and wherein said anode assembly further comprises an anode current collector sheet consisting essentially of metal bonded with bonding material directly to the back side of said anode frame so that it faces an outer surface boundary of the cell and said anode is inserted into said cavity so that it is in contact with a portion of said anode current collector sheet;

wherein the anode frame width is at least as wide as the cell thickness to provide a first elongated leakage block path for said cell, said first electrolyte leakage block path defined by said bonding material between said anode frame and said anode current collector sheet to reduce the chance of electrolyte leaking from the cell interior to the external environment;

wherein the cathode assembly comprises a cathode frame comprising a plastic material, said cathode frame having an inner peripheral edge defining the boundary of a cathode cavity, an outer peripheral edge defining the outer boundary of the cathode frame, said cathode frame having a first side and opposing second side comprising said peripheral edges; said cathode assembly further comprising a cathode current collector sheet consisting essentially of metal bonded directly to the opposing second side of said cathode frame so that it faces an outer surface boundary of the cell; and a cathode inserted into said cathode cavity so that it is in contact with said cathode current collector sheet.

2. The cell of claim 1 wherein plastic film wrap is applied over the cell exterior surface leaving exposed a negative terminal contact portion and positive terminal contact portion on the cell surface.

3. The cell of claim 2 wherein there is adhesive sealant between said plastic film wrap and the cell exterior surface.

4. The cell of claim 2 wherein a band of said film wrap is applied peripherally around the edges which comprise the short dimension of said cell and heat shrunk over at least the majority of said edges of the cell.

5. The cell of claim 2 wherein the plastic film wrap comprises at least a first and second plastic film layer.

6. The cell of claim 5 wherein there is adhesive sealant between the cell surface and said first plastic film layer.

7. The cell of claim 6 wherein there is adhesive sealant between said first plastic film layer and said second plastic film layer.

8. The cell of claim 6 wherein there is adhesive sealant between the cell surface and at least a portion of said second plastic film layer.

9. The cell of claim 5 wherein there is adhesive sealant between the cell surface and said first plastic film layer, there is adhesive sealant between the cell surface and a portion of said second film layer and there is adhesive sealant between said first and second film layers.

10. The cell of claim 9 wherein each of the first and second film layers are applied in the form of a closed film band, and acting together cover over at least the majority of said cell surface.

11. The cell of claim 9 wherein each of the first and second film layers are applied in the form of a closed film band and acting together cover over at least the majority of said cell surface and wherein said film bands have their central longitudinal axis at right angles to each other.

12. The cell of claim 10 wherein said first film band is applied peripherally around the edges which comprise the short dimension of said cell and heat shrunk over at least the majority of said edges of the cell; and wherein said second film band is applied laterally over the majority of the two opposing sides of said cell and heat shrunk to cover over at least a part of said first film band.

13. The cell of claim 10 wherein each of said bands is heat shrunk over said cell.

14. The cell of claim 12 wherein the adhesive sealant between the cell surface and said first film band, the adhesive sealant between the cell surface and said second film band and the adhesive sealant between said first and second film bands provides a second electrolyte leakage block path for said cell.

15. The cell of claim 14 wherein said second electrolyte leakage block path extends from the outer peripheral edge of said anode frame to said negative terminal, said distance being at least as long as the cell thickness.

16. The cell of claim 3 wherein the overall thickness of said cell is between about 0.5 and 6 mm, wherein said overall thickness is defined as the distance between the outside surface of said opposing sides of said cell.

17. The cell of claim 16 wherein said first and second electrolyte leakage block paths together span a distance at least between about 1.5 and 4 times the cell thickness.

18. The cell of claim 3 wherein the exposed area on the cell surface forming said negative terminal contact comprises between about 1 and 5 percent of the cell footprint area.

19. The cell of claim 3 wherein said cell is of cuboid shape and rigid structure.

20. The cell of claim 3 wherein the cathode comprises solids comprising manganese dioxide and an aqueous electrolyte solution comprising potassium hydroxide in admixture with said solids, wherein the cathode is a semisolid having a porosity between about 45% and 70%.

21. The cell of claim 20 wherein the cathode material further comprises graphitized carbon black.

22. The cell of claim 1 wherein the anode and cathode frames are bonded together with a separator therebetween to form a laminate structure.

23. The cell of claim 22 wherein said laminate structure forms said cell, said laminate structure being adhesively sealed so that cell contents are retained within said structure.

24. The cell of claim 22 wherein the positive terminal is in electrical communication with the cathode current sheet and the negative terminal is in electrical communication with said anode current collector sheet.

25. The cell of claim 1 wherein said opposing sides of said cell are parallel to each other.

26. The cell of claim 23 wherein said anode and cathode frames are comprised of electrically insulating material.

27. The cell of claim 1 wherein the anode current collector sheet comprises copper.

28. The cell of claim 1 wherein the cathode current collector sheet consists of metal and has a coating of carbon thereon.

29. The cell of claim 22 wherein the cathode current collector sheet comprises nickel and said cathode current collector sheet has a coating of carbon thereon.

30. The cell of claim 1 wherein the cathode current collector sheet comprises nickel.

* * * * *